Patented May 26, 1942

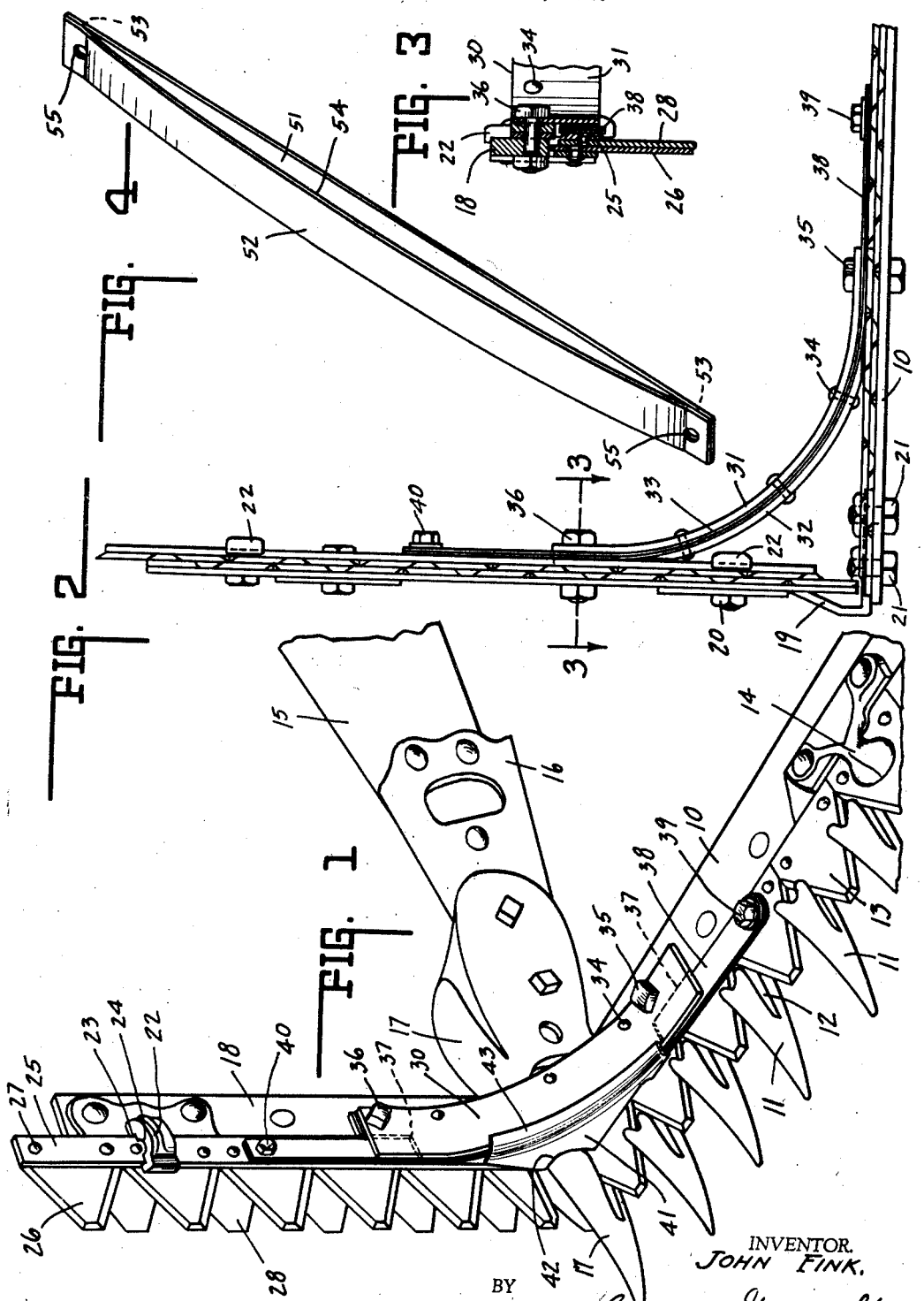

2,284,517

UNITED STATES PATENT OFFICE 2,284,517

DIVIDER SICKLE AND DRIVE

John Fink, New Palestine, Ind.

Application September 12, 1940, Serial No. 356,473

9 Claims. (Cl. 74—501)

This invention relates to an attachment for mowing machine.

The chief object of this invention is to provide an attachment for a mowing machine which will cut a vertical path through a matted field which is being mowed so that all the crop subject to the mower action proper is cut and that which is not so subject remains uncut regardless of the matted condition of the crop at the time of mowing.

Substantially all mowing machines are provided with what is known as a divider board and stick. The purpose thereof is to divide the crop in the aforesaid manner. However, when the crop is very much matted, the divider structure fails to function and, in fact, acts as a retardant in the normal mowing operation. It, therefore, has been proposed to provide a vertical cutter bar so as to vertically cut the crop at the free end of the mower. The present invention is directed to such type of construction and, more particularly, a power operating arrangement and the connections between the vertical cutting attachment and the mower proper.

The chief feature of the invention, as previously set forth, consists in the vertical mower drive, the mounting thereof, and the guard arrangements between the mower and the vertical cutter.

Other objects and features will be set forth more fully hereinafter.

The full nature of the invention will be understood from the accompanying drawing, the following description and claims:

In the drawing,

Fig. 1 is a perspective view of the free end of a mowing machine with a vertical sickle attachment applied thereto and with the invention associated therewith.

Fig. 2 is a front elevation of the same, the guard being omitted for clearness.

Fig. 3 is a transverse sectional view taken on the line 3—3 of Fig. 2 and in the direction of the arrows.

Fig. 4 is a perspective view of the unitary flexible metallic drive element in free position.

In the drawing, 10 indicates a conventional sickle bar which is stationary. 11 indicates a plurality of stationary guards. 12 indicates a ledger plate portion thereof. 13 indicates the movable sickle section or cutter which cooperates with the ledger plate portion for severance of the crop. 14 indicates a guard structure and retainer arrangement for retaining in position and slidably guiding the horizontally reciprocating sickle knives or cutting elements. These reciprocate to and fro and cooperate with the ledger plate portions, resulting in severance of the crop.

The numeral 15 indicates a board structure and 16 a casting support therefor. This is suitably connected to the bar 10 by member 17. The vertical sickle attachment includes the stationary vertical bar 18 which is suitably connected by the bolts 21 to the horizontal stationary bar 10. Supported by the vertical stationary bar 18 is one or more guide members 22 which have the guideway 23 therein and the relieved portion 24 for clearance purposes, the guideway retaining the attachment reciprocating bar arrangement 25, the latter having secured thereto the vertically reciprocable cutting blades 26 secured to said bar as at 27.

Herein, 17 indicates the outside shoe casing. To the same is attached casting 16, in turn carrying the board 15. The outside shoe casing is the corner element.

The stationary vertical bar 18 carries the stationary knives or cutting elements 28 and the same cooperate with the vertically reciprocable knives or cutting elements 26 to sever all angularly and laterally directed material so as to cut a vertical path at the end of the mower structure.

A U-shaped structure is indicated generally by the numeral 30 in Fig. 1. It includes spaced quarter circle curved bar members 31 and 32 which are open at one side and, preferably, the forward side and form a groove therebetween which is indicated by the numeral 33. The opposite side of that groove is preferably closed in any suitable manner. By reciting that the same is open or closed, it is not intended that the entire space between the two members 31 and 32 must be open or closed respectively. Preventing escapement of the driving element from the groove laterally of the guide structure is highly desirable. The guide structure proper is suitably secured at its lower end as at 35 to the stationary mower element 10 and is secured as at 36 to the stationary vertical bar 18.

The arcuate member 32 is longitudinally and laterally relieved, as indicated at 37, at opposite ends. The purpose thereof is to permit the driving element hereinafter set forth, to merge and engage tangentially the movable plate structures, or rather their supports and connections.

Herein, such driving element is indicated generally in Fig. 1 by 38 and it is secured as at 39 to one of the reciprocable mower elements 13 and secured as at 40 to the vertically reciprocable element 25 to which the several movable knives or teeth 26 are secured. This element is shown more clearly in Fig. 4. Thus, when the members 13 are reciprocated to and fro, the members 26 are reciprocated vertically through this drive construction.

There is provided a guard structure 41 which is recessed as at 42 to permit the extension of the shoe casting therebeyond. This guard is provided with a flange portion 43 which overlies the outer curved member 31 and thus, in effect, constitutes a closure for the groove and a retainer for the drive. This guard prevents material from entering between the relative stationary parts of the vertical sickle and the horizontal sickle portion as well as the groove arrangement constituting a portion of the connection therebetween, the other portion of the connection, being for example the bracket member 19.

Reference will now be had more particularly to Fig. 4. Herein, the simplest form of drive construction is illustrated. There is therein shown a single metallic strap which is flexible and is of spring steel and indicated by the numeral 51.

Adjacent thereto is another strap indicated by the numeral 52. Strap 52 has a length greater than 51 and the two are suitably secured together at their ends as at 53. The result is that strap 52 is bowed relative to strap 51 as indicated at 54. This drive structure at each end is provided with an anchoring opening 55. One opening 55 is adapted to receive the anchorage 39, the other opening 55 is adapted to receive the anchorage 40, previously referred to.

It will be apparent from Figs. 1 and 2 that when the drive element shown in Fig. 4 is mounted in the curved groove arrangement 30 that the two adjacent surfaces of the members 51 and 52 are in substantially coextensive surface contact throughout their lengths.

It, of course, is quite apparent that if more strength is required an additional leaf may be included which would be still longer than the leaf or strap 52 and would be arched to a greater degree. In that event, a three-element drive structure would, when arranged with the ends at right angles, have all of the intermediate confronting surfaces in substantially continuous coextensive contact. The resulting drive structure is relatively simple, of great strength and is fully sufficient for the purpose herein illustrated, and, furthermore, has the advantage that there is no obstruction in the drive element between the ends or, more especially, there is no obstruction in that portion of the drive element that rides in the groove arrangement previously described.

While the invention has been illustrated and described in great detail in the foregoing description, the same is to be considered as illustrative and not restrictive in character.

The several modifications described herein, as well as others which will readily suggest themselves to persons skilled in this art, are all considered to be within the broad scope of the invention, reference being had to the appended claims.

The invention claimed is:

1. In combination an arcuately grooved guide structure, and a reciprocating flexible strap structure slidable in the guide groove and including a plurality of elongated strap elements of dissimilar length having their ends secured together, the difference in length being such that the confronting faces of adjacent strap elements when in the groove having substantially continuous contact.

2. A flexible metallic strap structure suitable for reciprocating movement, the ends being movable in directions angular to each other, and including a plurality of metallic spring straps secured together at opposite ends and of dissimilar length, each longer strap being bowed with a radius more than the radius of the adjacent shorter strap whereby when the structure is curved the confronting surfaces are in substantially continuous contact.

3. A structure as defined by claim 2, characterized by the shortest strap normally being straight when free from extraneous constraint.

4. A drive arrangement between two angularly positioned sickle structures, each having a stationary portion and a cooperating portion reciprocable parallel to the general direction of the said structure, said arrangement including a flexible metallic strap means secured at opposite ends to the adjacent ends of the reciprocable portions, and a guide structure including an arcuate groove therein in which the strap means is oscillatable, said groove being of substantially closed character, except at its ends for peripheral retention of the strap means therein, the flexible metallic strap means including a plurality of flexible metallic straps secured together only adjacent the opposite ends, the straps being of dissimilar length.

5. A drive arrangement between two angularly positioned sickle structures, each having a stationary portion and a cooperating portion reciprocable parallel to the general direction of the said structure, said arrangement including a flexible metallic strap means secured at opposite ends to the adjacent ends of the reciprocable portions, and a guide structure including an arcuate groove therein in which the strap means is oscillatable, said groove being of substantially closed character, except at its ends for peripheral retention of the strap means therein, the flexible metallic strap means including a pair of flexible straps secured together only adjacent the opposite ends, one strap being longer than the other and appropriately arched.

6. A drive arrangement between two angularly positioned sickle structures, each having a stationary portion and a cooperating portion reciprocable parallel to the general direction of the said structure, said arrangement including a flexible metallic strap means secured at opposite ends to the adjacent ends of the reciprocable portions, and a guide structure including an arcuate groove therein in which the strap means is oscillatable, said groove being of substantially closed character, except at its ends for peripheral retention of the strap means therein, the flexible metallic strap means including a plurality of flexible metallic straps secured together only adjacent the opposite ends, the straps being of dissimilar length, the difference in length being such relative to the arcuity that confronting adjacent strap faces, when in the groove, having substantially continuous facial contact.

7. A drive arrangement between two angularly positioned sickle structures, each having a stationary portion and a cooperating portion reciprocable parallel to the general direction of the said structure, said arrangement including a flexible metallic strap means secured at opposite ends to the adjacent ends of the reciprocable portions, and a guide structure including an arcuate groove therein in which the strap means is oscillatable, said groove being of substantially closed character, except at its ends for peripheral retention of the strap means therein, the flexible metallic strap means including a pair of flexible straps secured together only adjacent the opposite ends, one strap being longer than the other and appropriately arched, the difference in length being such relative to the arcuity that confronting adjacent strap faces, when in the groove, having substantially continuous facial contact.

8. A drive arrangement between two angularly positioned sickle structures, each having a stationary portion and a cooperating portion reciprocable parallel to the general direction of the said structure, said arrangement including a flexible metallic strap means secured at opposite ends to the adjacent ends of the reciprocable portions, and a guide structure including an arcuate groove therein in which the strap means is oscillatable, said groove being of substantially closed character, except at its ends for peripheral retention of the strap means therein, the flexible metallic strap means including a plurality of flexible metallic straps secured together only adjacent the opposite ends, the straps being of dissimilar length, the difference in length being such relative to the arcuity that confronting adjacent strap faces, when in the groove, having substantially continuous facial contact, the shortest strap normally being straight when the strap means is disconnected from the reciprocable members and free of the groove.

9. A drive arrangement between two angularly positioned sickle structures, each having a stationary portion and a cooperating portion reciprocable parallel to the general direction of the said structure, said arrangement including a flexible metallic strap means secured at opposite ends to the adjacent ends of the reciprocable portions, and a guide structure including an arcuate groove therein in which the strap means is oscillatable, said groove being of substantially closed character, except at its ends for peripheral retention of the strap means therein, the flexible metallic strap means including a pair of flexible straps secured together only adjacent the opposite ends, one strap being longer than the other and appropriately arched, the difference in length being such relative to the arcuity that confronting adjacent strap faces, when in the groove, having substantially continuous facial contact, the shortest strap normally being straight when the strap means is disconnected from the reciprocable members and free of the groove.

JOHN FINK.